US012762143B2

(12) United States Patent
Zhang et al.

(10) Patent No.: US 12,762,143 B2
(45) Date of Patent: Oct. 13, 2026

(54) METHOD, APPARATUS, AND READABLE STORAGE MEDIUM FOR LEVERAGING DATA FORMATS BASED ON OPERATORS TO ACCELERATE DATA PROCESSING

(71) Applicant: Huawei Technologies Co., Ltd., Shenzhen (CN)

(72) Inventors: Zanqing Zhang, Markham (CA); Sundar Annamalai, Ajax (CA); Denghong Liao, Chengdu (CN); Congzhi Cai, Chengdu (CN); Haoen Luo, Chengdu (CN); Songling Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/584,791

(22) Filed: Feb. 22, 2024

(65) Prior Publication Data

US 2025/0272308 A1 Aug. 28, 2025

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
CPC ........................... G06F 16/258; G06F 16/1794
See application file for complete search history.

(56) References Cited

U.S. PATENT DOCUMENTS

| | | | | |
|---|---|---|---|---|
| 2005/0102325 | A1* | 5/2005 | Gould | G06F 16/24554 |
| 2005/0102613 | A1* | 5/2005 | Boukouvalas | G06F 16/24526 715/237 |
| 2015/0169714 | A1* | 6/2015 | Imai | G06F 16/258 707/602 |
| 2020/0042495 | A1* | 2/2020 | Held | G06N 20/00 |
| 2020/0175357 | A1* | 6/2020 | Chen | G06N 3/063 |
| 2021/0042158 | A1* | 2/2021 | Proud | G06F 9/5044 |

* cited by examiner

*Primary Examiner* — Kavita Stanley
*Assistant Examiner* — Lin Lin M Htay
(74) *Attorney, Agent, or Firm* — Slater Matsil, LLP

(57) ABSTRACT

Described provides a data processing method, where the method includes the following steps: receiving a data processing request; storing the plurality of first data as a first data format and executing the first data processing on the plurality of first data, wherein the first data format is determined based on the first data processing; and storing the plurality of second data as a second data format and executing the second data processing on the plurality of second data, wherein the second data format is determined based on the second data processing. As far as the data can be stored in different formats according to different data processing, the match between data format and data processing are improved. Described further provides a data processing system, as well as an apparatus, a readable storage medium to which the foregoing method is applied.

13 Claims, 12 Drawing Sheets

METHOD, APPARATUS, AND READABLE STORAGE MEDIUM FOR LEVERAGING DATA FORMATS BASED ON OPERATORS TO ACCELERATE DATA PROCESSING

TECHNICAL FIELD

The present disclosure relates to the database field, and in particular, to a method, system, apparatus, and readable storage medium for data processing.

BACKGROUND

A database can realize a variety of data processing functions, such as aggregation, conversion, arithmetic, screening, etc. In order to realize these functions, a database system, after receiving a SQL (structured query language) statement, can obtain a physical plan required for the data processing. Based on the physical plan, the database system can perform a query execution, such as scanning, filtering, aggregation, etc. However, the data format may affect the efficiency of data processing. For example, in the case that the data processing includes aggregation, and filtering, if the data to be processed is stored in row-based format, which means all column values of a row are stored contiguously, then execution will take an extended period of time when querying a single column of data resulting in low efficiency. Accordingly, there is a continued need to provide techniques that leverage specific data formats to accelerate data processing.

SUMMARY

For the foregoing problems, described is a method, system, apparatus, and readable storage medium for data processing, where the data can be stored in different formats according to different data processing, thus improving the match between data format and data processing, and further improving the efficiency of data processing.

According to a first aspect, described is a method for data processing, including: receiving a data processing request that indicates processing on data in a database, the processing includes first data processing and second data processing, the first data processing different than the second data processing; storing the plurality of first data as a first data format and executing the first data processing on the plurality of first data; and storing the plurality of second data as a second data format and executing the second data processing on the plurality of second data, wherein the second data format is different from the first data format, the first data processing has a higher execution efficiency for the first data format compared to the second data format, and the second data processing has a higher execution efficiency for the second data format compared to the first data format.

According to some embodiments, the data format of the first data and the second data can be adjusted to the data format corresponding to the first data processing and the second data processing, respectively. So the data format of the pending data can be changed in real-time according to actual needs, which not only ensures the efficiency of data processing, but also eliminates the need to store the same data content as multiple files, thereby saving storage layout costs. Moreover, the pending data belongs to the same storage engine, so only one execution engine is required to be utilized to retrieve the data in the storage engine, and multiple execution engines can be avoided to be set up for different storage engines, which may lead to redundant structure of the database system.

In a possible implementation manner of the first aspect, the database includes an SQL database, and the data processing request includes a query request.

In a possible implementation manner of the first aspect, and the second data format each include at least one of row-based format, column-based format, and hybrid format.

In a possible implementation manner of the first aspect, when the first data processing comprises a one of aggregation, filtering, and inter-column operation, the first data format includes column-based format; when the first data processing includes one of merging, itemizing, and inter-row operation, the first data format comprises a row-based format; and when the first data processing includes at least one of aggregation, filtering, and inter-column operation, and at least one of merging, itemizing, and inter-row operations, the first data format comprises a hybrid format.

In a possible implementation manner of the first aspect, the first data format is determined based on the order in which the plurality of first data is read during the first data processing.

In a possible implementation manner of the first aspect, when the reading order includes row-by-row reading, the first data format includes row-based format; and when the reading order includes column-by-column reading, the first data format includes column-based format.

In a possible implementation manner of the first aspect, when the reading order including sequentially reading the data of the first target row, the data of the second target row, and the first target row and the second target row are not adjacent to each other, the first data format is to store the first target row and the second target row adjacent to each other; and when the reading order including sequentially reading the data of the first target column, the data of the second target column, and the first target column is not adjacent to the second target column, the first data format is to store the first target column and the second target column adjacent to each other.

In a possible implementation manner of the first aspect, the database includes a first physical operator, the first physical operator including a first phase and a second phase, and the first data processing is executed by the first phase and the second data processing is executed by the second phase.

In a possible implementation manner of the first aspect, the database includes the first physical operator and the second physical operator, and the first data processing is executed by the first physical operator, and the second data is executed by the second physical operator.

In a possible implementation manner of the first aspect, the first data processing, the second data processing are executed sequentially, and the plurality of second data includes the result of the first data processing.

In a possible implementation manner of the first aspect, the plurality of first data includes at least one of data in the database, data obtained by processing based on the data in the database; the plurality of second data includes at least one of data in the database, and/or data obtained by processing based on the data in the database.

According to a second aspect, described is a data processing system, including: a parsing module, for receiving a data processing request, wherein the data processing request is for requesting to execute processing on data in a database, the processing including different first data processing and second data processing; a format conversion module, for storing the plurality of first data as a first data format, and storing the plurality of second data as a second data format, wherein the first data format is determined based on the first data processing, the second data format is determined based on the second data processing, and the second data format is different from the first data format; a processing module, for executing the first data processing on the plurality of first data, and executing the second data processing on the plurality of second data.

According to a third aspect, described is an apparatus for data processing, including: one or more processors; and memory storing computer-executable instructions that, when executed by the one or more processors, cause the apparatus to: receive a data processing request that indicates processing on data in a database, the processing includes first data processing and second data processing, the first data processing different than the second data processing; store the plurality of first data as a first data format and executing the first data processing on the plurality of first data; and store the plurality of second data as a second data format and executing the second data processing on the plurality of second data, wherein the second data format is different from the first data format, the first data processing has a higher execution efficiency for the first data format compared to the second data format, and the second data processing has a higher execution efficiency for the second data format compared to the first data format.

According to a fourth aspect, described is a non-transitory computer-readable storage medium storing instructions thereon, which when executed by one or more processors, cause a device to: receive a data processing request that indicates processing on data in a database, the processing includes first data processing and second data processing, the first data processing different than the second data processing; store the plurality of first data as a first data format and executing the first data processing on the plurality of first data; and store the plurality of second data as a second data format and executing the second data processing on the plurality of second data, wherein the second data format is different from the first data format, the first data processing has a higher execution efficiency for the first data format compared to the second data format, and the second data processing has a higher execution efficiency for the second data format compared to the first data format.

BRIEF DESCRIPTION OF THE DRAWINGS

The foregoing summary, as well as the following detailed description of the embodiments, will be better understood when read in conjunction with the appended drawings. However, the present disclosure is not limited to the precise arrangements and instrumentalities shown.

DETAILED DESCRIPTION OF THE ILLUSTRATIVE EMBODIMENTS

Illustrative embodiments include, but are not limited to a method, system, apparatus, and readable storage medium for model training.

Note that the embodiments are applicable to various databases having functions of storing, querying, and managing data. For example, it may be any one of MySQL, Oracle, SQLServer, postgreSQL, i.e., a relational database that stores and manages data in the form of tables. Noted that relational database is only an example, and the embodiments described are not limited to a relation database system, it is also applicable for any of the database system including but not limited to RDBMS and distributed SQL engines (like Presto DB, TrinoDB, Spark, etc.).

Figure 1:
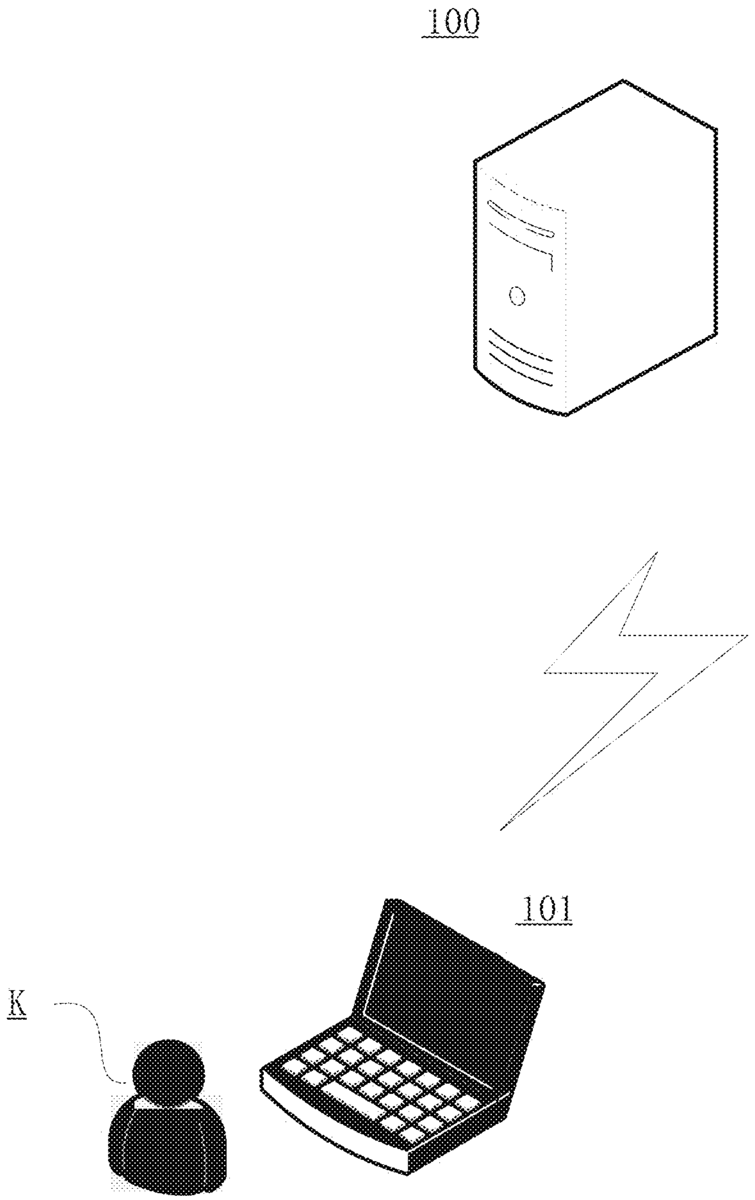
FIG. 1 illustrates a schematic diagram of a scenario of data processing according to some embodiments.

The electronic devices of described embodiments may be various forms of digital computers, such as, for example, laptops, desktop computers, workstations, personal digital assistants, servers, blade servers, mainframe computers, and other suitable computers. Also, the electronic devices may be smartphones, tablets, laptops, smart speakers, digital assistants, augmented reality (AR)/virtual reality (VR) devices, smart wearables, and other types of devices. For example, taking the laptop computer 101 as an example, FIG. 1 illustrates a scenario diagram in which a user K, via the laptop computer 101, issues a query request to the server 100 which operate on data in database. Wherein, the user's query request may according to an SQL-based query execution, including querying, filtering, aggregating, and the like.

The server 100 may be a stand-alone physical server, a server cluster or a distributed system comprising multiple physical servers, and may also provide cloud services, cloud database, cloud computing, cloud functions, cloud storage, network services, cloud communications, middleware services, domain name services, security services, CDN (Content Delivery Network Distribution Network), and a cloud server for basic cloud computing services such as big data and artificial intelligence platforms, and may also be an on-board controller.

In some embodiments, the server 100 may receive data processing requests, i.e., query requests, and respond to the data processing requests. Corresponding to each data processing request, the service area 100 may generate a physical plan. The physical plan includes at least one physical operator executing based on a predetermined logic, such as parallel execution, serial execution, mixed serial and parallel execution, etc. And, each physical operator executes a data operation having one or more phases, wherein in each phase the physical operator performs the same or different processing operations on the data, such as one of operations such as join, filter, project, etc. Wherein each phase corresponds to a data format, e.g., join corresponds to a data format for row storage.

As mentioned before, in a database, the data format of the pending data affects the efficiency of data processing.

The following is a brief description of the data in different data formats and their processing in conjunction with the accompanying drawings.

Figure 2A:
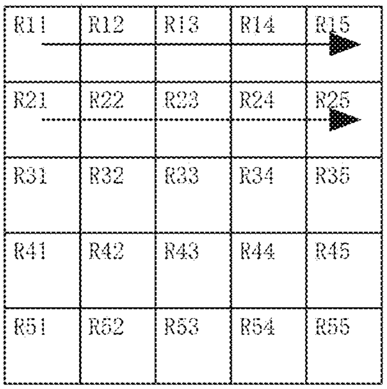
FIG. 2A illustrates a schematic diagram of a Row-Major format data according to some embodiments.

FIG. 2A illustrates a schematic diagram of a Row-Major format data according to some embodiments. As shown in FIG. 2A, the pending data table F1 includes five rows of data from R1 to R5, wherein each row of data is stored continuously. For example, the five data R11-R15 included in R1 are stored continuously. For example, the data in R1 may be stored in the form of an array, such as (R11, R12, R13, R14, R15), so that R11-R15 are stored continuously in row R1. For the data in the pending data table F1 are stored in such Row-Major format, the query may be efficient in circumstance of reading or processing data row-by-row, e.g., first querying the data in R1 and then querying the data in R2.

When querying the above-described Row-Major format data table, if the queried data are all located in the same row, or in a certain number of rows, the data can be quickly located by querying row by row, which is more efficient. On the contrary, if the queried data are spread over each row, for example, all data in a certain column are queried, then it is necessary to traverse every row in order to query all data belonging to a certain column, thus it will spend extra time on the data that does not need to be queried. Taking the data table F1 shown in FIG. 2A as an example, the first row R1 includes five data R11-R15, and the second row R2 includes five data R21-R25. In some scenarios, if the data to be queried for a certain query request includes the data in the first column C1, i.e., R11, R21, R31, R41, R51, and these five data are stored in five rows of data respectively, such as five arrays, the database system needs to traverse R1 to R5, in which it traverse the irrelevant data such as R12, R13 and so on, resulting in the expenditure of extra time.

Figure 2B:
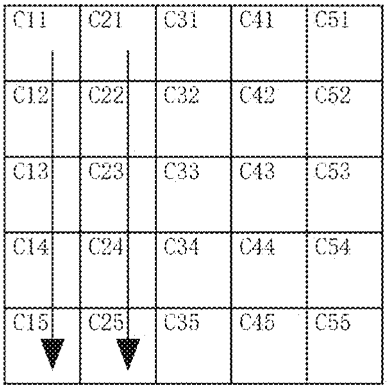
FIG. 2B illustrates a schematic diagram of a Column-Major format data according to some embodiments.

FIG. 2B illustrates a schematic diagram of a Column-Major format data according to some embodiments. As shown in FIG. 2B, the pending data table F2 includes five columns of data from C1 to C5, wherein the data in each column is stored continuously. For example, the five data C11-C15 included in C1 are stored continuously. For example, the data in C1 may be stored as an array, such as (C11, C12, C13, C14, C15), so that C11-C15 are stored continuously in column C1. Wherein, for the data stored in Column-Major format data table F2, the query may be efficient in circumstance of reading or processing data column-by-column, e.g., first querying the data of C1 and then querying the data of C2.

When querying the above Column-Major format data table, if the queried data are located in the same column, in certain columns, or need to be queried in inter-column arithmetic, the data can be quickly located by querying column by column, which is more efficient; on the contrary, if the queried data are distributed in each column, for example, all data in a certain row, it is necessary to traverse every column in order to query the data belonging to a certain row from each column, thus it will spend extra time on the data that does not need to be queried. Taking the data table shown in FIG. 2B as an example, the first column C1 includes five data from C11-C15, and the second column C2 includes five data from C21-C25. In some scenarios, the data to be queried for a certain query request includes the data in the first row R1, i.e., C11, C21, C31, C41, C51, and these five data are stored in five columns of data, such as five arrays, and therefore, the database system needs to traverse the data in the upper five columns from C1 to C5, in which it needs to traverse the irrelevant data such as C12, C13 and so on, which leads to the expenditure of extra time.

To summarize, the Row-Major format data and Column-Major format data are applicable to different type of database data query, reading and processing scenarios, and only in the adapted scenarios will they play a higher data processing efficiency. For example, if a physical operator's phase performs inter-row processing of data, the execution efficiency of data based on Row-Major format is higher for that phase.

In order to solve the above problem, in some embodiments, the same data can be stored as Row-Major data and Column-Major data by means of a row storage engine and a column storage engine provided by the database system. When data processing is performed and the data in the database needs to be queried, if the desired data processing corresponds to the Row-Major data, the row execution engine corresponding to the row storage engine is utilized to make a call on the data in the row storage engine in order to complete the data processing; for the same reason, if the desired data processing corresponds to the Column-Major data, the column execution engine corresponding to the column storage engine is utilized to perform the data processing.

In the above embodiment, the database system includes a plurality of storage engines and a plurality of execution engines. The data can be deposited into different storage engines in different data formats according to the processing requirements, for example, the data that needs to be processed row-by-row should be deposited into the storage engine corresponding to the row storage in the manner of Row-Major storage. Another example is that MySQL includes two storage engines, MyISAM and InnoDB, and the data that needs to be filtered and processed can be deposited into MyISAM in the prescribed format of MyISAM. In this embodiment, each execution engine corresponds to each storage engine, and each execution engine can invoke the data in its corresponding storage engine to perform the data processing, for example, the execution engine that performs the row-based processing can invoke the storage engine for Row-Major data, so as to traverse and read the data in rows to complete the data processing.

However, since the above embodiment employs a plurality of storage engines to store data in different format of the same content, this results in the need for a high storage layout cost. Moreover, corresponding to each storage engine a specific execution engine needs to be employed to perform data processing on the data in the storage engine, resulting in increasing the complexity of the database system.

In order to solve the problems in the above embodiments, a data processing method is provided. Specifically, in the data processing method, after receiving a data processing request for a database, a data format required for each phase corresponding to the data processing request may be obtained. That is, the data format required for each phase of a physical operator in the physical plan corresponding to the data processing request. Then, during the execution of each phase of the data processing, the data format of the input data of any phase can be adjusted to the data format corresponding to that phase before executing that phase. Through the method of this disclosure, the data format of the pending data can be changed in real-time according to actual needs, which not only ensures the efficiency of data processing, but also eliminates the need to store the same data content as multiple files, thereby saving storage layout costs. Moreover, the pending data belongs to the same storage engine, so only one execution engine is required to be utilized to retrieve the data in the storage engine, and multiple execution engines can be avoided to be set up for different storage engines, which may lead to redundant structure of the database system.

In some optional embodiments, the input data of each phase includes data stored in the database and/or output data of other phases. For example, if the data processing for a phase is a scan of data in the database, the input data for that phase can be data stored in the database. Another example is that a phase has a preorder phase, then the output data of the preorder phase can be the input data of the phase. Note that the data format indicates the order in which the data is stored, or the order in which the data is read and written.

In some optional embodiments, the data format may be stored in Row-Major format, i.e., in rows as shown in FIG. 2A, or may be stored in Column-Major format, i.e., in columns as shown in FIG. 2B.

In some optional embodiments, the data format may also be stored in a hybrid format, for example, a portion of the data is stored row by row, and a portion of the data is stored column by column, such as the data in a few columns is read and written column by column, and the data in the other columns is read and written row by row. For another example, the data can be divided into multiple groups, each of which takes a row-based format, or a column-based format.

For example, the data format of the hybrid format is shown in FIG. 3A-FIG. 3D.

Figure 3A:
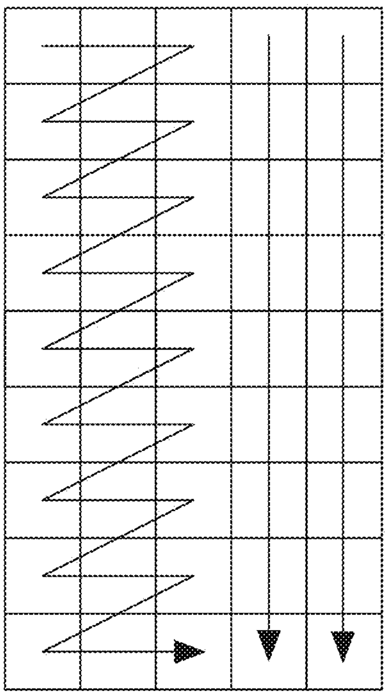
FIG. 3A illustrates a schematic diagram of a first type of data format according to some embodiments.

As in FIG. 3A, the first 3 columns of data can be stored in Row-Major format, while the last 2 columns of data can be stored in columns, and the format can be referred to as (3, 1), (1, 1).

Figure 3B:
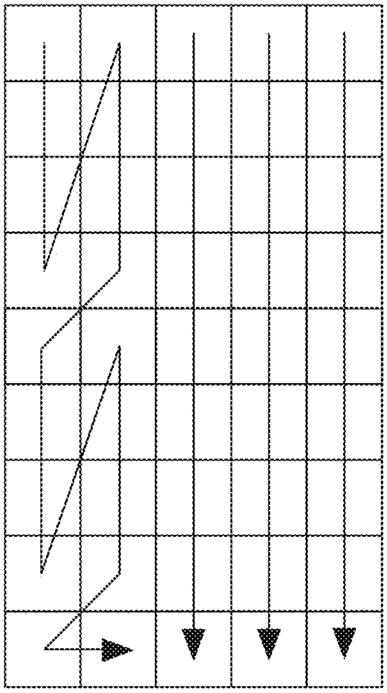
FIG. 3B illustrates a schematic diagram of a second type of data format according to some embodiments.

As in FIG. 3B, the first 2 columns of data can be stored in Column-Major format for every 4 rows, and the format can be referred to as (4, 2), while the last 3 columns of data can be stored in regular Column-Major format, and the format can be referred to as (1, 1).

Figure 3C:
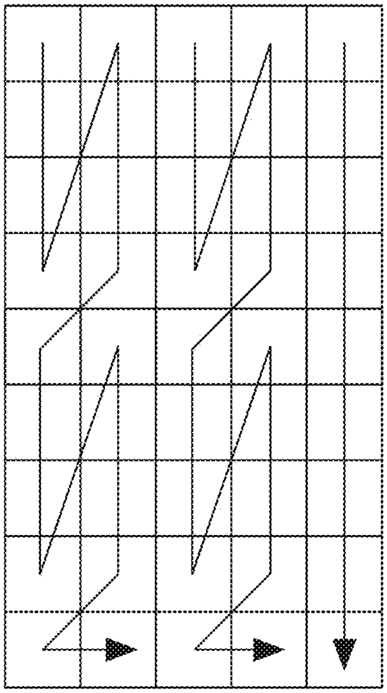
FIG. 3C illustrates a schematic diagram of a third type of data format according to some embodiments.

As in FIG. 3C, the first 4 columns of data can be stored in a group of every 4 rows and every 2 columns in Column-Major format, and the format can be referred to as (4, 2), (4, 2). The last 1 column of data can be stored in regular Column-Major format, and the format can be referred to as (1, 1).

Figure 3D:
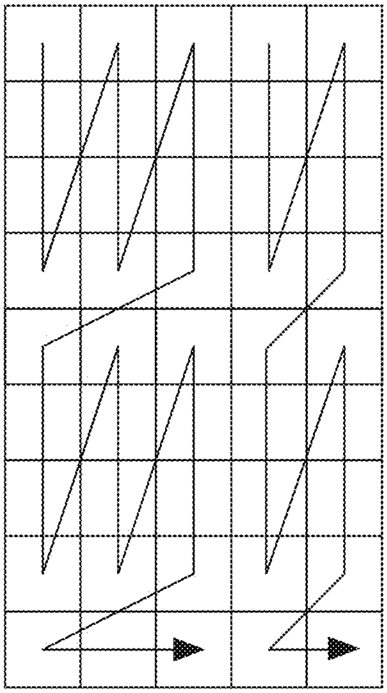
FIG. 3D illustrates a schematic diagram of a fourth type of data format according to some embodiments.

As in FIG. 3D, the first 3 columns of data may be stored in Column-Major format in groups of every 4 rows, and the format can be referred to as (4, 3), and the last 2 columns of data may be stored in Column-Major format in groups of every 4 rows, and the format can be referred to as (4, 2).

In an optional embodiment, the physical operator may have different functions, of which it can perform different data operations on the data. For example, the physical operator may include a scan physical operator, an aggregation physical operator, and a filter physical operator to perform scanning operations, aggregating operations, and filtering operations on the pending data, respectively. Among them, each physical operator may have a plurality of phases, that the data input to the physical operator passes through a plurality of phases to obtain output data. Since the data format required for each phase may be different, the data format may change as the data is transmitted among the physical operators. For example, the first phase requires Row-Major format data, while the second phase requires mixed-stored data. In this example, the data format of the pending data in the first phase can be Row-Major format, while the data format of the pending data in the second phase needs to be changed from Row-Major format to hybrid format.

In an optional embodiment, a judgment may be made as to whether the data format of the pending data needs to be updated based on the execution type of the current phase, and the data format of the input pending data. Wherein, the data format indicates the order of reading and writing data in the pending data.

For example, if the physical operator O1 includes phase P1 and phase P2, wherein phase P1 includes column-by-column reading of N columns of data, and phase P2 includes row-by-row reading of M columns of data, then the data format of the pending data can be first determined in phase P1 to determine whether or not the data format of the pending data is adapted to the processing method of column-by-column reading of N columns. If that N-column data in the pending data is not in Column-Major format, it is determined that the pending data needs to be updated, and the data format of the pending data may be updated to the desired Column-Major format, and the updated pending data may be processed to complete phase P1.

Figure 6A:
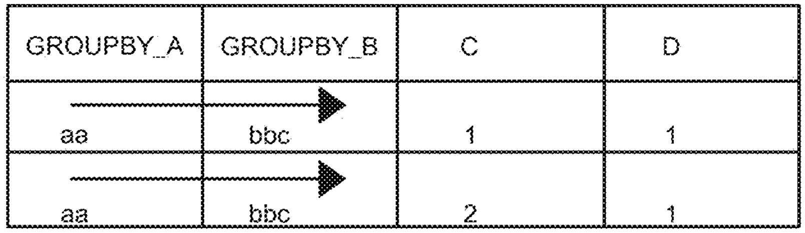
FIG. 6A illustrates a schematic diagram of a first type of data according to some embodiments some embodiments.

For example, an exemplary structure of this pending data may refer to FIG. 6A. In this embodiment, the physical operator O1 may change the data format of the input pending data to the format shown in FIG. 6A, and for example, phase P1 may be: filtering the data of column N, and phase P2 may be: perform inter-row summing on the data in column M.

Note that there may be various ways of adjusting the storage of the pending data corresponding to each phase of the physical operator. It may be that the data format of the input data is changed in each phase in the order of execution, or it may be that a one-time change is made to the pending data after it is inputted into the physical operator, in which case the changed data format applies to all the phases of that physical operator. For example, by using a hybrid format of storage, a portion of the data to be executed for each phase is modified to a data format that is adapted to that phase.

For example, for physical operator O1 described above, since phase P1 needs to read N columns of data column by column, phase P2 needs to read M columns of data row by row. If the current pending data is in Row-Major format, the pending data can be updated to Column-Major format first, i.e., updated to the Column-Major format illustrated in FIG. 2B, in phase P1. After phase P1 is completed, the pending data can be updated to Row-Major format, i.e., updated to the Row-Major format illustrated in FIG. 2A, in phase P2, so that physical operator O1 in phase P2 can read M columns of the updated data row by row.

Further, for example, for the above-described physical operator O1, after the pending data is input to O1, the pending data may also be directly updated as follows: the N-column data as Column-Major format, and the M-column data as Row-Major format. For example, the pending data may be a data table as shown in FIG. 6A, in which both row storage and column storage formats exist. After the pending data is updated, it can be adapted to read the N-column data column by column in phase P1, and at the same time, it can be adapted to read the M-column data row by row in phase P2. In this way, the physical operator O1 can directly complete the data processing of phase P1 and phase P2 based on the one-time updated pending data.

According to some embodiments, the VectorBatch may be used as a data structure in the pending data stored in the database system. It can be understood that during the query execution process of SQL, the data can be passed in the physical operator with the data structure of the VectorBatch, during which the data structure based on the VectorBatch can be changed according to the data processing of the physical operator, including deformation, expansion, contraction, and so on.

According to some embodiments, the VectorTransformer may update the data format for the pending data in the database system, which means rewriting the VectorBatch into another format based on the VectorOrder. It can be understood that the VectorOrder stands for the order to read or write the data.

Figure 4A:
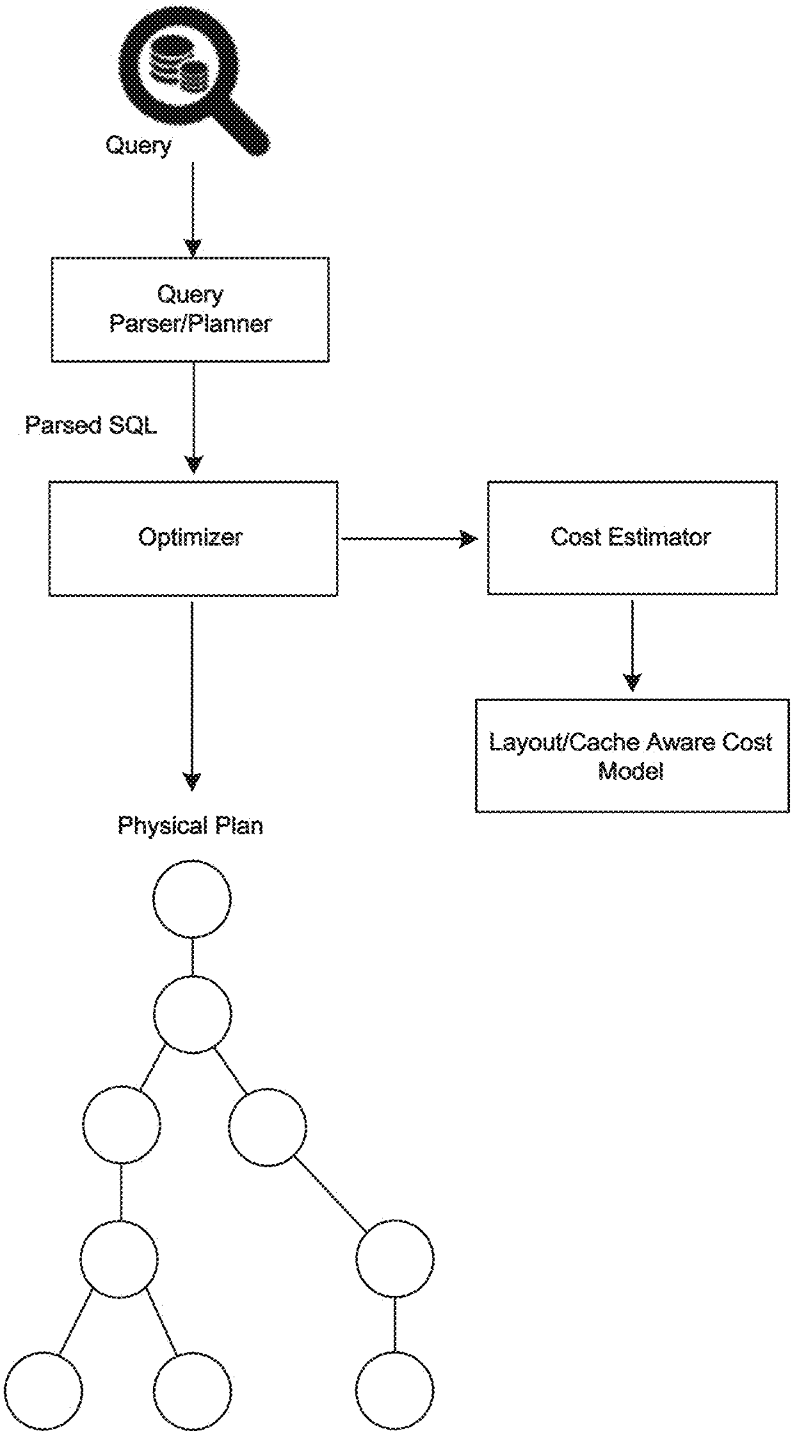
FIG. 4A illustrates a schematic structural diagram of a database system according to some embodiments.

As is shown in FIG. 4A, a database system includes query Parser and query optimizer.

Query is the SQL statement that either operates on or retrieves data from the database. With the input of query, query parser transfer the query into logical plan, which is a collection of logical operators that describe the work required to generate query results and define which data sources and operators to apply. Examples of Logical Operators are Scan, Join, Aggregation, etc.

The query optimizer attempts to determine the most efficient method for the SQL statement to access the requested data. The optimizer applies various types of rules to rearrange logical plan into an optimal plan, and then converts the optimal plan into a physical plan, which describes the chosen physical plan for a query statement. For example, the type, execution logical relationship, and the corresponding logical operator of the physical operators.

Query optimizer can comprise cost estimator, which estimates the cost of query execution based the available statistics. The logical plan with the lower cost can be considered the optimal plan.

For our database, the cost of the query depends on various factors such as number of operations, access methods, join operations and data distribution. A basic formula that represents the idea of cost estimation is:

Cost=(Number of I/O operations)*(Cost per I/O operation).

Here, the "Number of I/O operations" refers to the estimated number of disk or memory operations required to execute the query plan. "Cost per I/O Operation" reflects the time and resources required for that specific operation.

Incorporating memory layout considerations into a query cost model can improve the accuracy of cost estimation, as memory access patterns can significantly impact query performance.

Cost=(Number of I/O operations)*(Cost per I/O operation)+(Number of Cache Misses)*(Cost per Cache Miss).

Estimating cache miss can be tricky as it depends on hardware architecture, cache hierarchy, and cache size and data layout in memory. We leverage statistical models or profiling information to estimate cache behavior. And the data we need to consider includes the following:

Data Profiling: Collect profiling information about the query workload's memory access patterns. Monitor how often different memory locations are accessed, the frequency of access, and the pattern of access (sequential, random, etc.).

Cache Parameters: Gather information about the cache hierarchy, including the size, associativity, and block size of each cache level. These parameters directly impact cache behavior.

Access Patterns Analysis: Identify the data structures and data layouts used in the query workload. Analyze the access patterns of these data structures (sequential, random, etc.). Determine whether there are any spatial or temporal patterns in data access.

Spatial and Temporal Locality: Calculate metrics like spatial locality (how closely related memory locations are accessed) and temporal locality (how often the same memory location is accessed).

Use the four type of data from above, cache miss estimation can be done to estimate cache miss rates for different cache levels.

Physical operator implement the functionally described by the Logical Operator. Few examples are TableScan, Filter, HashAgg, HashJoin, SortMergeJoin, etc.

Figure 4B:
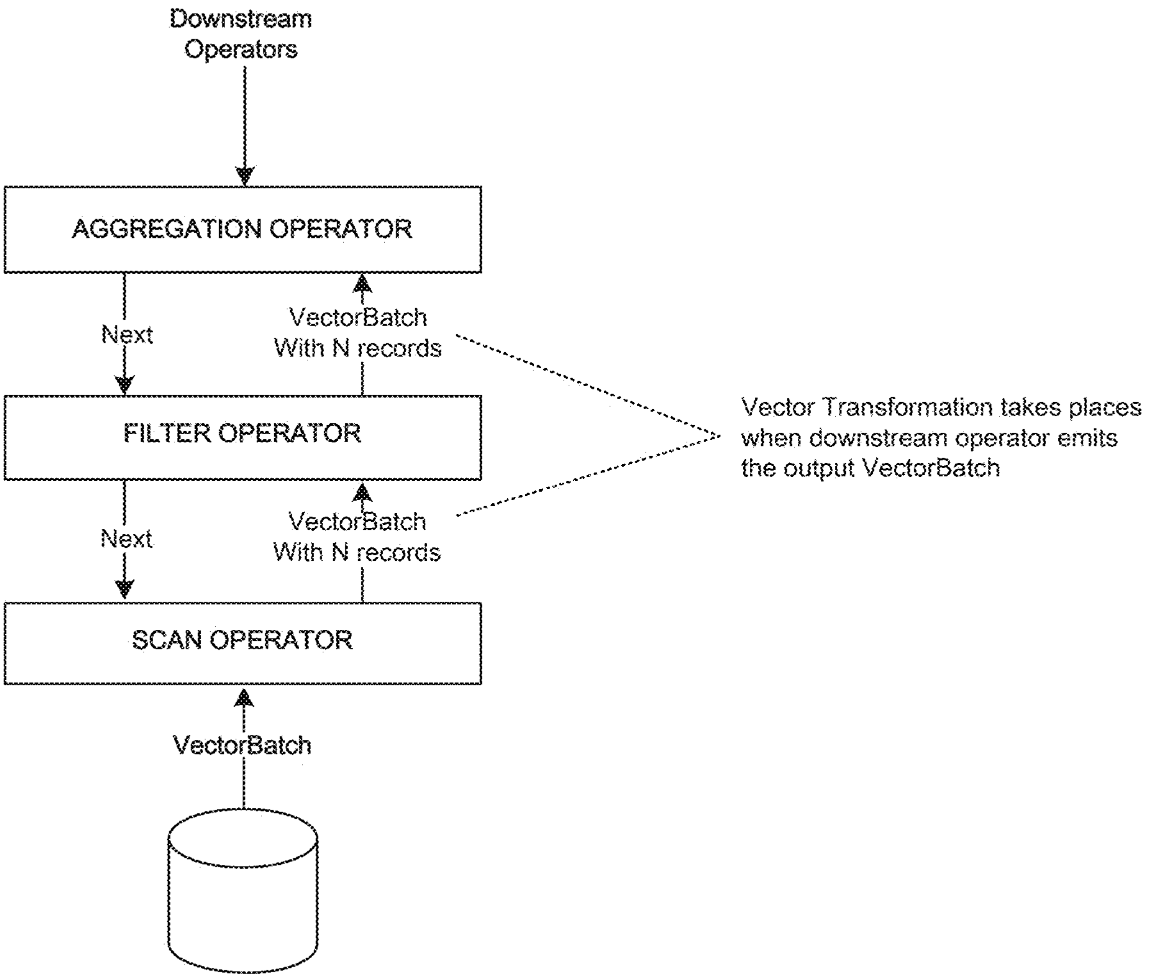
FIG. 4B illustrates a schematic diagram of a physical plan according to some embodiments.

As is shown in FIG. 4B, physical operators may include Aggregation Operator, Filter Operator, Scan operator. First of all data is fed into Scan operator in VectorBatch, which represent the data structure that get passed between the physical operators. Then the output of Scan Operator is fed into Filter Operator, the output of Filter operator is fed into Aggregation Operator.

Figure 5:
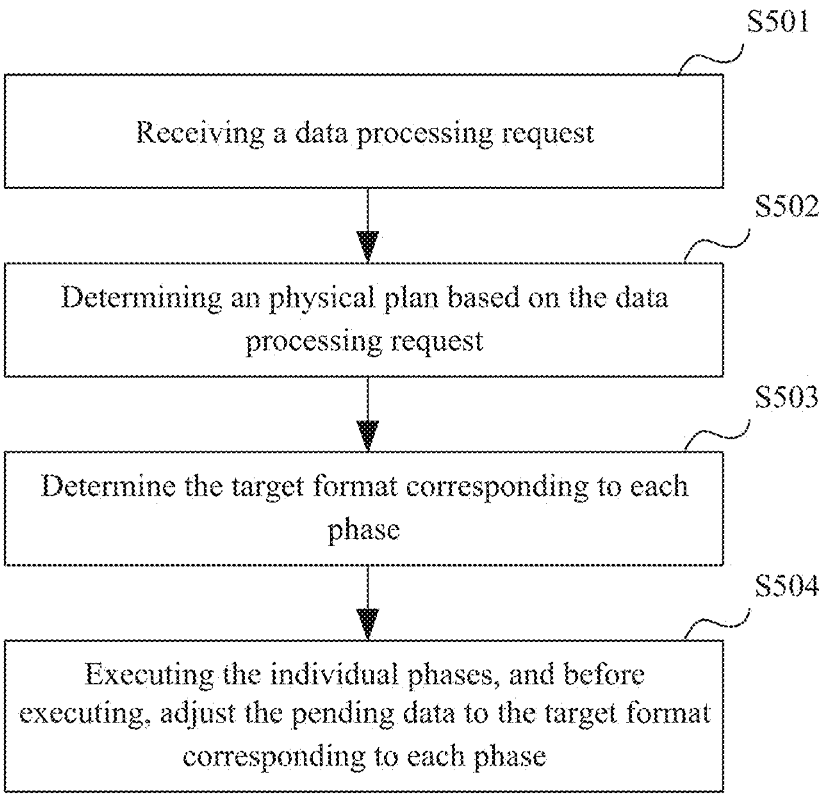
FIG. 5 illustrates a schematic flowchart of a data processing method according to some embodiments some embodiments.

A data processing method of some embodiments is described below based on FIG. 5. It is understood that the execution subject of the method may be a server 100. as shown in FIG. 5, the method comprises:

S501: Receiving a Data Processing Request.

In an optional embodiment, the data processing request may be a query request entered into the database system.

Optionally, the user may input the data processing request to the query execution device via a user device. By way of example, the user device is also a laptop computer 101 as shown in FIG. 1, and the query execution device may be a server 100 as shown in FIG. 1. In an optional embodiment, one or more user devices may issue one or more data processing requests to the query execution device. The user devices may include input/output (I/O) interfaces, and the query execution device may include input/output (I/O) interfaces to communicate with the user devices.

As described above, in the database system according to FIG. 4A, a query request may be an SQL statement that performs an operation on a database or retrieves data from a database. The database system may parse the query in order to utilize the database's own functions to respond to the query.

S502: Determining a Physical Plan Based on the Data Processing Request.

In an optional embodiment, the server 100 may parse the data processing request to obtain an physical plan. For example, as shown in FIG. 4A, the query parser receives the query and converts the query into a logical plan, including a collection of logical operators. Examples of logical operators are Scan, Join, Aggregation, and so on. An optimizer of the database system then converts the logical plan into a physical plan to respond to the data processing request by executing the plan.

Wherein, the physical plan may include at least one physical operator, a logical relationship between the at least one physical operator, and the execution function for each physical operator.

That is, the at least one physical operator is obtained, as well as specific operations for each physical operator to perform data execution. For example, as illustrated in FIG.

4B, there may be three physical operators, and the logical relationship between the three physical operators may be a sequential execution relationship. Among them, the three physical operators may correspond to Scan, Join, and Aggregation, respectively, in order.

It is understood that each physical operator may perform multiple phases during execution, wherein each phase may utilize a query execution function to process the pending data, e.g., each phase may utilize a SQL function to process the data.

The following describes three optional embodiments of a physical operator and describes the respective phases contained in the physical operator in each embodiment.

As a first example of a physical operator, the function performed by the physical operator may be aggregation.

In this embodiment, the aggregation operation performed by the physical operator on the data in the database may be a HashAgg operation.

The physical operator in this embodiment includes a first phase, a second phase, and a third phase, and the three phases have different query execution functions. Among them, the first phase is to group the data in rows, while the second phase and the third phase are to perform operations on the data in columns.

First, for the first phase, a hash value is calculated and the data is grouped based on the hash value. For example, a hash value may be calculated for each data in a column. It is understood that the same hash value represents the same data. Then, the same hash values are divided into a group, i.e., the same data is divided into a group.

For example, the first phase may be a groupby operation on the data in columns A and B. By grouping the data, the same values in columns A and B are divided into the same group. For example, as illustrated in FIG. 6A, all rows of data in column A as aa and column B as bbc are grouped into a group. The grouping may include two rows of data, (aa,bbc,1,1) and (aa,bbc,2,1), where aa and bbc can be used as data for the new columns GROUPBY_A, GROUPBY_B.

Then for the second phase, column data is processed using the column format of the aggregator.

Figure 6B:
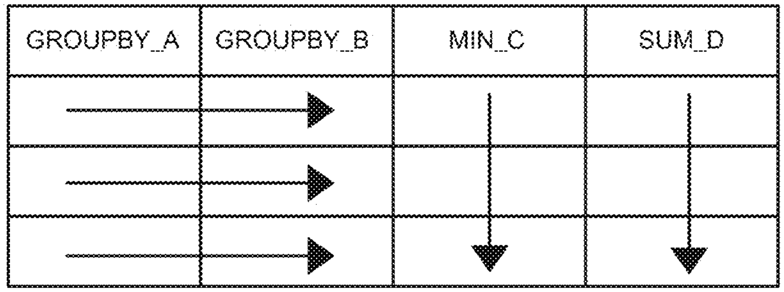
FIG. 6B illustrates a schematic diagram of a second type of data according to some embodiments.

For example, a minimum operation is performed on the data in column C. For the grouped data to filter the minimum value, e.g., for each array of columns A and B (aa, bbc), get the minimum value of column C of all the data it corresponds to. For example, if the value of column C in the two data in the above grouping is 1 and 2 respectively, the minimum value of column C is 1 as shown in FIG. 6B, and the minimum value obtained is used as the data for the new column MIN_C.

Then after the third phase, further column data processing is performed using the column format of the aggregator.

For example, a summing operation is performed on column D, i.e., a summing is computed for the grouped data, e.g., by summing column D for all data within a data grouping. For example, summing the D-column data of (aa,bbc,1,1) and (aa,bbc,2,1) in an exemplary grouping, i.e., adding the two 1's to obtain 2 as shown in FIG. 6B. Note that the summing obtained may be used as the data in a new column SUM_D.

In the above embodiment, it can be understood that the logical relationship among the first phase, the second phase and the third phase is executed in sequential order, which means that the output data of the first phase is used as the input data of the second phase, and the output data of the second phase is used as the input data of the third phase.

As a second example of a physical operator, the function performed by the physical operator may be filter and join.

In this embodiment, the merge operation performed by the physical operator on the data in the database may be a HashJoin operation.

The physical operator in this embodiment includes a first phase and a second phase, the two phases having different query execution functions. Wherein, the first phase is to filter the data in columns, while the second phase is to merge the data in rows.

First, for the first phase, the data in the first data table is filtered by columns using the filter.

For example, a filter operation may first be performed on the data in columns A and B in the first data table. The data in columns A and B may be filtered. For example, as illustrated in FIG. 6C, the data in columns A, aa, ac, and add are filtered, the data in columns B, bbc, bcd, and bdd are filtered, and the results of the filtering are used as the data for the new columns FILTER_A and FILTER_B, respectively.

Then for the second phase, the second data table, and the first data table filtered after the first phase, are hash-joined.

Figure 6C:
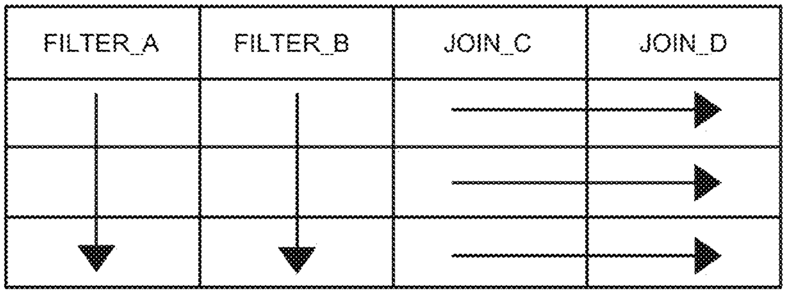
FIG. 6C illustrates a schematic diagram of a third type of data according to some embodiments.

For example, a HashJoin may be performed on the data based on columns C and D of the filtered first data table, as well as on the data in columns C and D of the second data table, that a row of data corresponding to columns C and D with values of (1, 2) in the first data table may be merged with a row of data with values of columns C and D with values of (1, 2) in the second data table, as shown in FIG. 6C. Wherein, the second data table is not shown in FIG. 6C.

Note that after merging a row of data of the first data table with a row of data of the second data table, the resulting merged data includes all columns of the first data table and the second data table. For example, both the data of the columns FILTER_A, FILTER_B in the first data table (aa, bbc) and the data of the columns other than columns C and D in the second data table are included.

In the above embodiment, it is understood that the logical relationship between the first phase and the second phase is executed in sequential order, which means that the output data of the first phase is used as the input data of the second phase.

As a third example of execution, the execution function of the physical operator may be may be Project, including filtering the data vertically to reduce the number of columns in the data table.

The physical operator in this embodiment includes a first phase and a second phase, the two phases having different query execution functions. For example, the first phase is to filter the data in columns, such as filtering a column of data, so as to shorten the number of rows of the data; and the second phase is to filter the columns of the data, such as filtering a part of the columns from all the original columns, and performing inter-row arithmetic on the data of the filtered columns.

First, for the first phase, make use of filters to filter the data in columns of the data table.

Figure 6D:
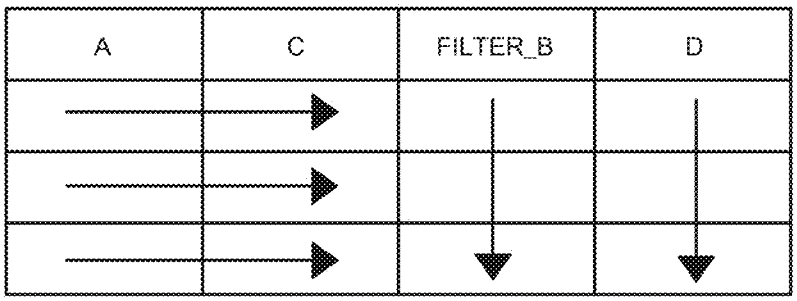
FIG. 6D illustrates a schematic diagram of a fourth type of data according to some embodiments.

For example, as illustrated in FIG. 6D, a filter operation may first be performed on the data in column B of the data table, i.e., each row of data belonging to the bbc, bcd, bdd data in column B is filtered out. Among them, bbc, bcd, bdd can be used as the data of the new column FILTER_B.

Then for the second phase, the data table obtained from the first phase can be horizontally filtered, in which a Project operation is performed on the data in a particular column, and an inter-row operation is performed on the filtered data.

For example, a summing operation may be performed on the data in columns A and C of the data table based on the filtered data to obtain the summed data table.

Figure 6E:
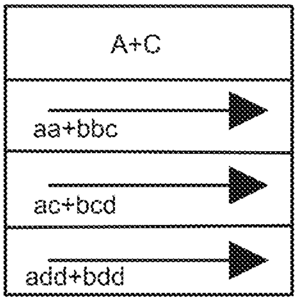
FIG. 6E illustrates a schematic diagram of a fifth type of data according to some embodiments.

In one example, as shown in FIG. 6D, a summing operation may be performed on the value aa in column A and the value bbc in column C in the same row to obtain aa+bbc as the data for the new column A+C in the new data table shown in FIG. 6E. Then, among the original columns of the data, only the new column A+C is retained, i.e., only the data of the column A+C as shown in FIG. 6E is included in the final output data in order to realize horizontal screening of the data.

As another example, the strings in columns A and C may also be concatenated. In this embodiment, the data in the new column A+C may be aabbc.

It should be noted that the above three embodiments of the physical operator are only exemplary, and the described does not qualify the specific implementation functions of the physical operator, as in other optional embodiments, the physical operator may have other functions.

S503: Determine the Target Format Corresponding to Each Phase.

It can be understood that the target format is: a data format that is most suitable for the phase and makes the execution of the phase most efficient. Wherein, the data format indicates the storage order of the data in the pending data, or the order in which the data in the pending data is read and written.

The data format according to some embodiments is described below.

Optionally, the data format may be stored according to rows, i.e., in rows as shown in FIG. 2A, or may be stored according to columns, i.e., in columns as shown in FIG. 2B.

Optionally, the data format may also be stored in a hybrid format, i.e., a part of the data is stored row by row and a part of the data is stored column by column. For example, the data in the first N columns is read and written column by column and the data in other columns is read and written row by row.

FIG. 3A-FIG. 3D illustrate four optional embodiments of hybrid format.

For example, the data format of the hybrid format is shown in FIG. 3A-FIG. 3D.

As in FIG. 3A, the first 3 columns of data can be stored in Row-Major format, while the last 2 columns of data can be stored in columns, and the format can be referred to as (3, 1), (1, 1).

As in FIG. 3B, the first 2 columns of data can be stored in Column-Major format for every 4 rows, and the format can be referred to as (4, 2), while the last 3 columns of data can be stored in regular Column-Major format, and the format can be referred to as (1, 1).

As in FIG. 3C, the first 4 columns of data can be stored in a group of every 4 rows and every 2 columns in Column-Major format, and the format can be referred to as (4, 2), (4, 2). The last 1 column of data can be stored in regular Column-Major format, and the format can be referred to as (1, 1).

As in FIG. 3D, the first 3 columns of data may be stored in Column-Major format in groups of every 4 rows, and the format can be referred to as (4, 3), and the last 2 columns of data may be stored in Column-Major format in groups of every 4 rows, and the format can be referred to as (4, 2).

It is to be noted that FIG. 6A-FIG. 6D above are examples only, and in other optional embodiments, the hybrid format may be based on other data read/write orders.

In one optional embodiment, each phase of the physical operator corresponds to a target format.

For example, in the first embodiment of the physical operator described above with respect to step S502, in conjunction with FIGS. 6A and 6B, the first phase is grouping the data in rows, and the second phase and the third phase are performing operations on the data in columns.

In the operation of grouping by rows, reading row by row is more efficient, and therefore the target format corresponding to the above-described first phase is a row-based storage. Moreover, in the operation of performing calculations in columns, reading column by column is more efficient, and therefore the target format corresponding to the second phase and the third phase described above are column-based storage, respectively.

As another example, in the embodiment of the second physical operator described above with respect to step S502, in conjunction with FIG. 6C, the first phase is to filter the data by columns, and the second phase is to merge the data by rows.

In the operation of filtering the data by columns, the column-by-column reading is more efficient, and therefore the target format corresponding to the above-described first phase is a columnar storage. Moreover, in the operation of merging the data in rows, reading the data row by row is more efficient, so the target format corresponding to the second phase described above is a row storage.

As another example, in the embodiment of the third physical operator described above with respect to step S502, in conjunction with FIGS. 6D and 6E, the first phase is to filter the data by columns, and the second phase is to filter the columns of the data, and inter-row operation is performed on the filtered data.

In the operation of filtering the data by columns, the column-by-column reading is more efficient, and therefore the target format corresponding to the above-described first phase is Column-Major format. Moreover, since it is more efficient to read the data row by row during the inter-row operation, the target format corresponding to the second phase described above is Row-Major format.

According to some embodiments, according to the specific execution function of each phase, a target format that enables its execution to be more efficient can be determined, so as to instruct the format conversion module in the database system to convert the format of the pending data, in order to update the data format from the original data format to the target format, so that the physical operator can realize higher data processing efficiency when querying the pending data for execution, and achieve a higher data processing efficiency when the physical operator executes on the pending data.

In an optional embodiment, step S503 may further be: determining the target format based on the phase, and the information of the pending data corresponding to the phase. It is understood that the information of the pending data may include statistical information of the columns, such as the type of the columns, the width of the columns, the minimum value of the columns, the maximum value of the columns, etc., which may be used to determine what data format is applicable to the phase.

For example, in the embodiment of the third type of physical operator described above with respect to step S502, in conjunction with FIGS. 6D and 6E, the pending data in the second phase includes data in columns A, B, and C, and the second phase needs to perform numerical operations on the data in columns A and C. At this case, it is possible to locate columns A, C in the pending data based on the column statistics, and determines that column B exists in columns A and C. Based on the principle of higher efficiency of inter-row arithmetic operations on data in neighboring columns, it can be determined that swapping columns B and C is the most appropriate data format, i.e., it corresponds to the column layout as shown in FIG. 6D. Accordingly, the target format corresponding to the second phase described above includes: storing the columns to be calculated in neighboring positions, i.e., storing columns A and C adjacent to each other as illustrated in FIG. 6D.

S504: Executing the Individual Phases, and Before Executing, Adjust the Pending Data to the Target Format Corresponding to Each Phase.

Note that when implementing a physical plan, physical operator can run in accordance with a logical relationship between the at least one physical operator included in the physical plan. e.g., parallel execution, sequential execution, and the like.

As one example, the physical plan may include a first physical operator, a second physical operator, and a third physical operator as described above, and all three may be executed in parallel. As another example, the physical plan may include three physical operators executed in sequential order as shown in FIG. 4B.

Wherein, each physical operator may include a plurality of phases. For example, the physical operator introduced above in conjunction with FIG. 6B includes three phases for filtering, minimizing, and summing, respectively.

Optionally, based on the execution function of each phase, it may be determined whether the data format of the data to be executed needs to be updated before the current phase begins.

For example, if the target format corresponding to the phase of the preceding sequence and the current phase are different, such as the row-based format shown in FIG. 2A and the column-based format shown in FIG. 2B, respectively, the data format of the data to be executed needs to be updated. That is, if the data format of the input data of the current phase is different from the target format corresponding to the current phase, it can be determined that the pending execution data needs to be updated.

For another example, if the phase of the previous sequence and the target format corresponding to the current phase are the same, it is determined that the pending execution data does not need to be updated at the current phase.

In an optional embodiment, the pending data may be updated by the format conversion module so that the pending data has the target format corresponding to the current phase.

As one example, each phase may correspond to a different target format. In other examples, multiple phases may correspond to the same target format, which means that multiple data processing methods all apply to the same data format. For example, the same data format may apply to all phases of a physical operator.

For example, in some embodiments in which a first phase is: filtering the data in columns A and B, and a second phase is: merging columns C and D, the data to be executed according to the hybrid format shown in FIG. 6C applies to both the first phase in which the data in columns A and B are filtered first, and the second phase in which columns C and D are merged at the same time. in this case, the physical operator can accomplish all phases based on the same data format of the data. For example, the target format shown in FIG. 6C can correspond to both phases at the same time.

In an optional embodiment, before the start of the first phase of each physical operator, if the target format of the last phase of the preceding physical operator is different from the target format corresponding to the first phase of the current physical operator, the data format of the pending execution data needs to be updated to the target format corresponding to the first phase of the current physical operator. For example, if the preceding physical operator is according to the embodiment of the second physical operator described above, and the current physical operator is some embodiments of the third physical operator described above, then the target formats are the hybrid format shown in FIG. 6C, and the target format shown in FIG. 6D, respectively. Another hybrid format, therefore, then the data format of the data to be executed needs to be updated between the phases of the two physical operators.

Through the described embodiments, it is possible to parse the data processing request, obtain the target format adapted to each phase in the physical plan of the data processing, and update the data format to the target format corresponding to the current phase, so that the physical operator can more efficiently perform querying and execution of the data during the process of querying and execution of the data. query processing, thereby being able to improve the data processing efficiency of the database system.

Moreover, the data format may include a hybrid format, that is, the data to be executed in the hybrid format may be able to support a variety of data processing modes, so that the data to be executed in the same data format may be applicable to a plurality of phases, then the number of times the data to be executed is updated may be reduced, system resources may be conserved, and at the same time, the efficiency of the operation of the system may be improved.

A data processing system according to some embodiments is described below based on FIG. 7.

Figure 7:
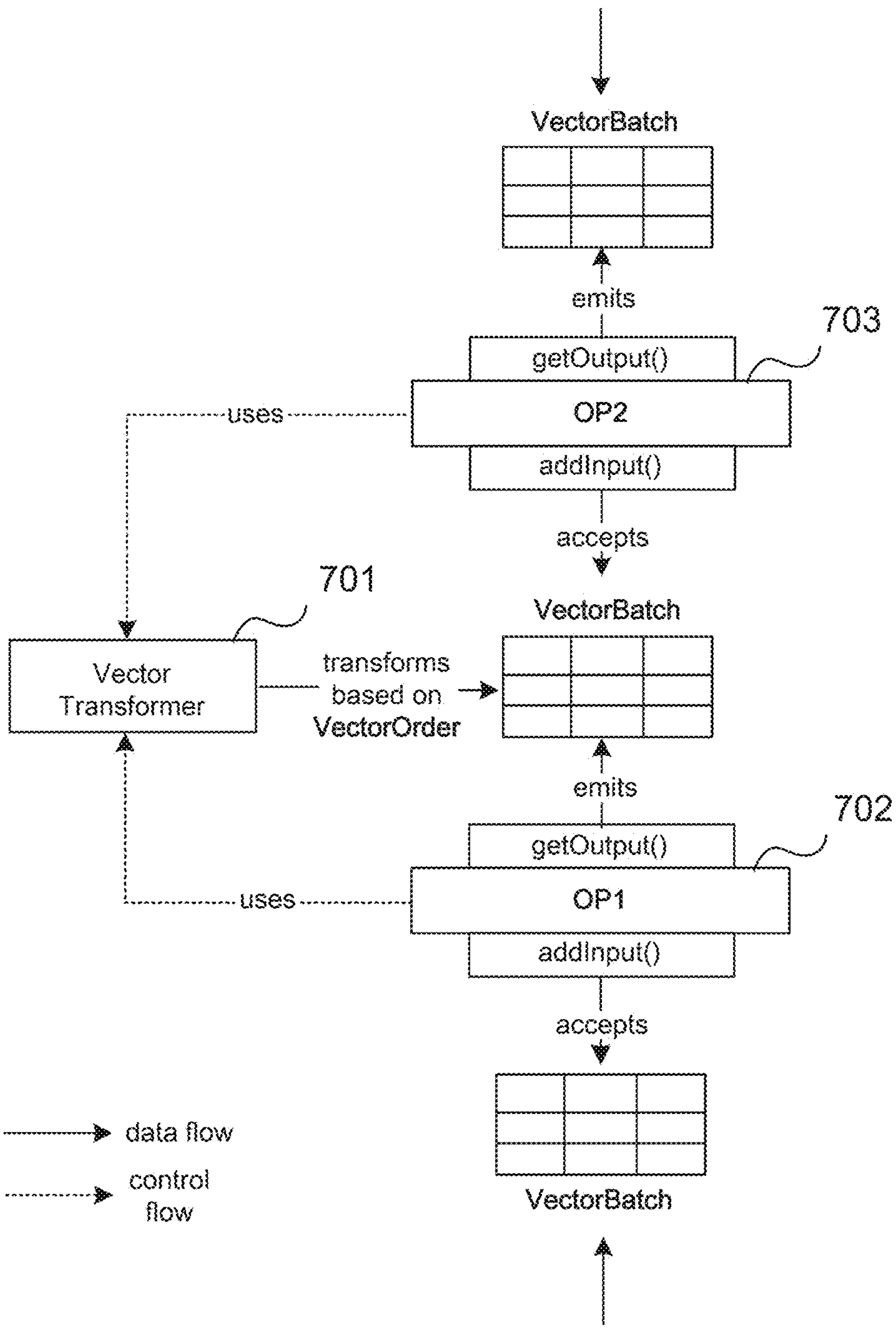
FIG. 7 illustrates a schematic structural diagram of a data processing system according to some embodiments.

According to some embodiments, the database system may include a format conversion module and at least one physical operator, for example, VectorTransformer 701 and OP1 702, OP2 703 shown in FIG. 7.

According to some embodiments, the data structure of the data may be a data structure that supports hybrid format, such as a VectorBatch. The VectorBatch may change, expand, and contract during data processing.

According to some embodiments, the data format may be expressed in the form of a data read/write order, such as a VectorOrder. Taking the data to be executed shown in FIG. 6D as an example, the data in the first 3 columns may be stored in column-based format in a group of 4 rows, and the format based on the VectorOrder may be referred to as (4, 3), and the data in the next 2 columns may be stored in column-based format in a group of 4 rows, i.e. The format can be referred to as (4, 2) based on the VectorOrder. In conclusion, the data format of the pending data shown in FIG. 6D is (4, 3), (4, 2).

As shown in FIG. 7, OP1 702, OP2 703 may control the Vector Transformer 701 to update the pending execution data of the VectorBatch data structure in the database, and it is understood that the Vector Transformer 701 may rewrite the VectorBatch based on the VectorOrder into another format. And, OP1 702, OP2 703 may retrieve the pending data from the database for data processing. Among other examples, the pending execution data may circulate among a plurality of physical operators in the database system, such as passing between OP1 702, OP2 703, so that the output of OP1 702 may be used as the input of OP2 703.

It should be noted that the data processing system shown in FIG. 7 is only an example, the number of physical operators, the type of physical operator connection logic, control flows, and other system structures in the data processing system are not limited to the described embodiments. For example, in other optional embodiments, the plurality of physical operators may also be in a parallel logical relationship with each other. In other optional embodiments, the number of physical operators may also be other numbers.

As in FIG. 7, the data format may be determined by the physical operator and the VectorTransformer 701 may be controlled to perform the update of the data to be executed. In other optional embodiments, other devices may also control the format conversion module.

For example, the data format may be defined by the user at various stages during deployment, when the data processing request is defined.

For example, the data processing request may be recognized by the user device 101 at the time the data processing request is defined, determining the data format for each phase, i.e., steps S502-S504 may be performed by the user device.

For example, the data format may also be determined by the server 100 after the data processing request is submitted, i.e., steps S502-S504 may be performed by the server 100.

For another example, the data format of the individual phases may be determined by the server 100 based on the prediction of the historical data of the historical query execution.

The data processing system and the data processing method of the embodiments may be based on the same conception.

Figure 8:
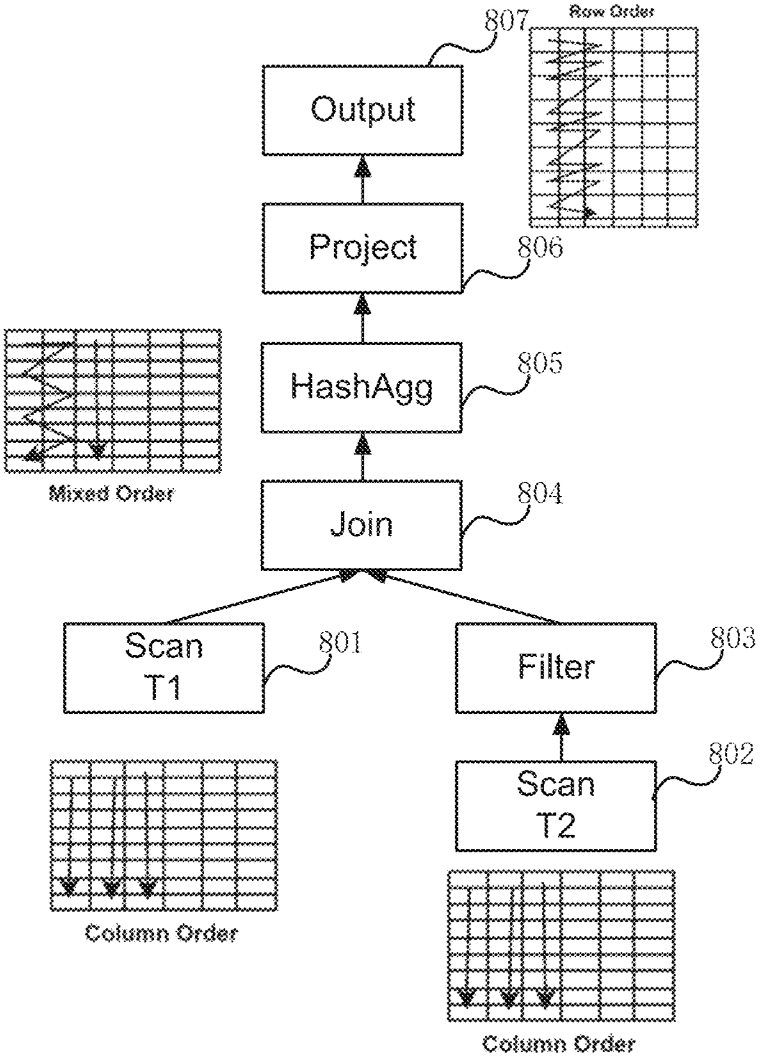
FIG. 8 illustrates a schematic flowchart of a query execution method according to some embodiments.

A physical plan for the data processing method according to some embodiments is further described below in connection with FIG. 8. As illustrated in FIG. 8, the physical plan includes the exemplary process described below:

801: Scan (T1).

The scan (T1) operator may scan the first data table. For example, scan the first data table in the database to obtain output data of the VectorBatch data structure.

As an example, the first data table may be the order information data table, whose data format may be Column-Major format.

802: Scan (T2).

The scan (T2) operator may scan the second data table. For example, scan the second data table in the database to obtain the output data of the VectorBatch data structure.

As an example, the second data table may be the customer information table, whose data format may be a Column-Major format.

803: Filter.

The filter operator may filter the second data table.

As an example, the country column in the customer information table may be filtered, in order to filter out the customer information data with a country data of "USA" as output data for the Filter operator. It is understood that the output data of the filter operator is the customer information data table for the USA region. In this embodiment, the filter operator can directly filter the second data table because the Column-Major format is adapted to the filter phase.

804: Join.

The join operator may merge the first data table and the second data table.

As an example, the first data table, the filtered second data table can be merged based on the order id, i.e., the data with the same order id column in the first data table, the filtered second data table can be merged to get the merged data.

For example, the join operator may first control the Vector Transformer 701 as shown in FIG. 7 during execution to modify the format of the pending data, to the row-based format, and then execute the data, so that the efficiency of merging the data in rows can be improved by reading the data row-by-row.

805: HashAgg.

It can be understood that HashAgg operator can be divided into the first phase, groupby phase, and the second phase, aggregation phase.

Wherein, the groupby phase may group the data, and the aggregation phase may aggregate the grouped data.

As an example, in the groupby phase, the pending data may be grouped based on the customer name, and the city of location, which means that all rows of data having the same customer name, and the city of location are divided into a group.

In the Aggregation phase, the order ids in each grouping may be counted, so that the number of orders for each customer in each city is obtained.

In this regard, the HashAgg operator can first control the Vector Transformer 701 as shown in FIG. 7 to modify the format of the data to be executed to be hybrid format, such as the data format of the columns that need aggregation is column-based, and the data format of the columns that need groupby is row-based. In this way, the modified data format can be made applicable not only to aggregation but also to groupby, which can improve the data execution efficiency of HashAgg operator.

806: Project.

It can be understood that Project Operator can be divided into the first phase, Filter Phase, and the second phase, Project Phase.

Wherein, the Filter Phase may vertically filter the aggregated data, and the Project Phase may horizontally filter and horizontally connect the vertically filtered data.

As an example, in the filter phase, the number of orders in the aggregated data can be filtered to retain data whose number of orders satisfies a quantity condition, such as data whose number of orders is greater than a quantity threshold.

In the Project phase, the data in the two columns of customer name and city can be filtered, and the data in the two columns can be connected, i.e., the name of the customer who placed a sufficiently large number of orders and the city can be used as the output data, e.g., (MikeNY), (NancyLA).

Project operator can control the Vector Transformer 701 as shown in FIG. 7 to modify the format of the data by modifying the data of the columns that need to be connected between the rows to be stored in row-based format, and then executing the query on the data. For example, the data in the Customer Name column and the City column are modified to Row-Major format. In this way, Project operator can read the data row by row and perform inter-row joins, which can improve the data execution efficiency; on the contrary, if the data is stored in columns, the phase for inter-row joins will spend a lot of time traversing the other rows of the two columns in the case where only one row of the data of the two columns needs to be read, resulting in inefficient execution.

According to some embodiments, query execution time and system performance is improved as operator is working with input data that is represented in an optimal format, and system is more flexible for not being restricted by a fixed order data layout. Wherein data format for memory layout can be decided at deployment time, whenever a workload being defined, whenever a workload being submitted, during execution of workload, etc.

Note that the above data processing method may be executed via the server 100 according to some embodiments.

Figure 9:
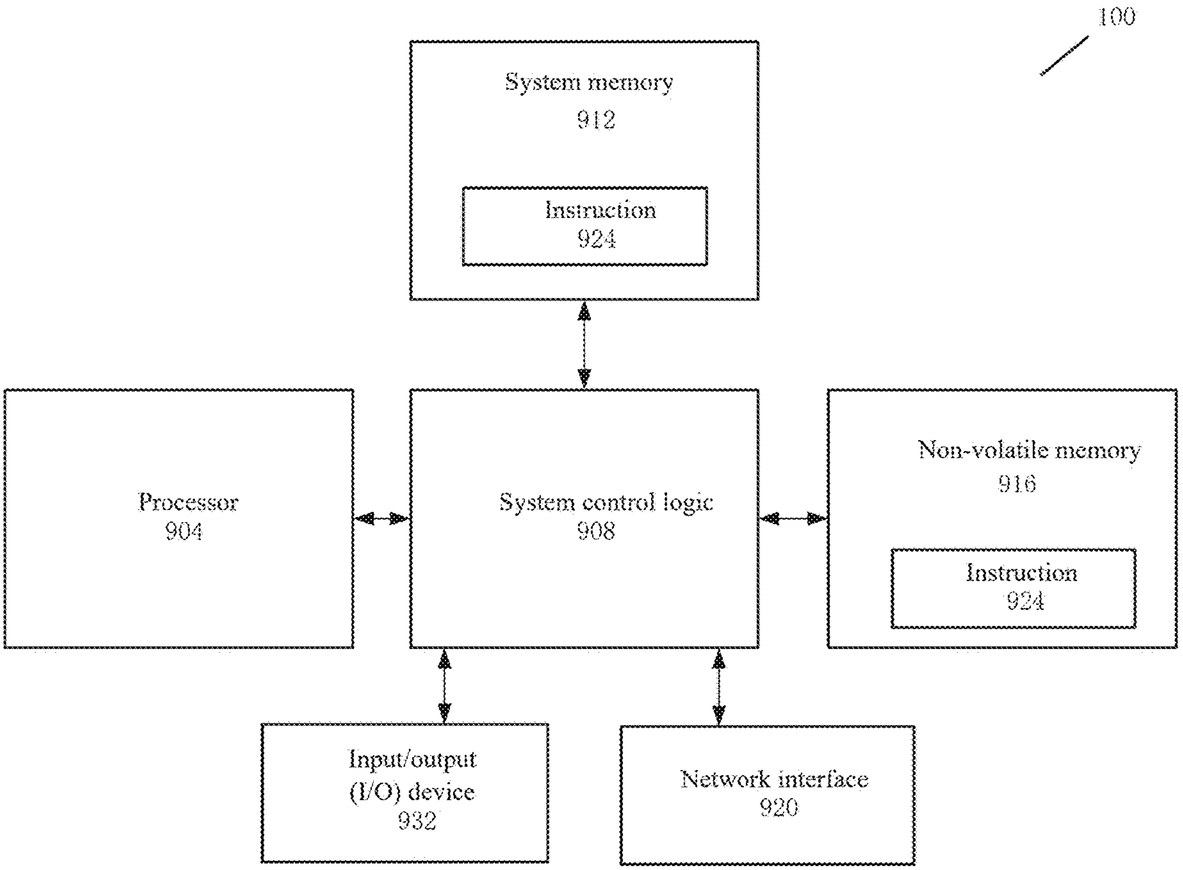
FIG. 9 illustrates a schematic structural diagram of an electronic device 100 according to some embodiments.

FIG. 9 shows a block diagram of the server 100 provided according to some embodiments. In some embodiments, the server 100 may include one or more processors 904, system control logic 908 coupled to at least one of the processors 904, system memory 912 coupled to the system control logic 908, non-volatile memory (NVM) 916 coupled to the system control logic 908, and a network interface 920 coupled to the system control logic 908.

In some embodiments, the processor 904 may include one or more single-core or multi-core processors. In some embodiments, processor 904 may include any combination of general purpose processors and specialized processors (e.g., graphics processors, disclosure processors, baseband processors, etc.). In embodiments where the server 100 employs an Enhanced Node B (eNB) or Radio Access Network (RAN) controller, the processor 904 may be configured to perform a variety of conforming embodiments.

In some embodiments, the system control logic 908 may include any suitable interface controller to provide any suitable interface to at least one of the processors 904 and/or any suitable device or component in communication with the system control logic 908.

In some embodiments, the system control logic 908 may include one or more memory controllers to provide an interface to the system memory 912. The system memory 912 may be used to load as well as store data and/or instructions. In some embodiments the system memory 912 of the server 100 may include any suitable volatile memory, such as a suitable dynamic random access memory (DRAM).

Non-volatile memory (NVM) 916 may include one or more tangible, non-transitory computer-readable media for storing data and/or instructions. In some embodiments, non-volatile memory (NVM) 916 may include any suitable non-volatile memory such as flash memory and/or any suitable non-volatile storage device such as a hard disk drive (HDD), a compact disc (CD) drive, a digital versatile disc (Digital Versatile Disc (DVD) drive.

The non-volatile memory (NVM) 916 may include a portion of the storage resources on the device on which the server 100 is installed, or it may be accessed by the device, but is not necessarily part of the device. For example, the non-volatile memory (NVM) 916 may be accessed over a network via the network interface 920.

The system memory 912 and the non-volatile memory (NVM) 916 may include: a temporary copy and a permanent copy of the instructions 924, respectively. The instructions 924 may include: instructions that, when executed by at least one of the processors 904, cause the server 100 to implement the data processing method referred to in the embodiments. In some embodiments, the instructions 924, hardware, firmware, and/or software components thereof may additionally/alternatively be placed in the system control logic 908, the network interface 920, and/or the processor 904.

The network interface 920 may include a transceiver for providing a radio interface to the server 100, which in turn communicates with any other suitable device (e.g., a front-end module, an antenna, etc.) over one or more networks. In some embodiments, the network interface 920 may be integrated with other components of the server 100. For example, the network interface 920 may be integrated into at least one of the processor 904's, the system memory 912, the non-volatile memory (NVM) 916, and the firmware device (not shown) having instructions that when at least one of the processor 904 executes said instructions, the server 100 implements the data processing methods referred to in some embodiments.

The network interface 920 may further include any suitable hardware and/or firmware to provide a multi-input multi-output radio interface. For example, the network interface 920 may be a network adapter, a wireless network adapter, a telephone modem, and/or a wireless modem.

In some embodiments, at least one of the processors 904 may be packaged with the logic of one or more controllers for the system control logic 908 to form a system in package (SiP). In one embodiment, at least one of the processors 904 may be integrated on the same core as the logic of the one or more controllers used for the system control logic 908 to form a system-on-chip (SoC).

The server 100 may further include: an input/output (I/O) device 932. The input/output (I/O) device 932 may include a user interface that enables a user to interact with the server 100; and a peripheral component interface designed to enable the peripheral components to also interact with the server 100. In some embodiments, the server 100 further includes sensors for determining at least one of environmental conditions and location information associated with the server 100.

In some embodiments, the user interface may include, but is not limited to, a display (e.g., LCD, touch screen display, etc.), a speaker, a microphone, one or more cameras (e.g., still image cameras and/or camcorders), a flashlight (e.g., light emitting diode flash), and a keyboard.

In some embodiments, peripheral component interfaces may include, but are not limited to, a non-volatile memory port, an audio jack, and a power connector.

In some embodiments, the sensors may include, but are not limited to, a gyroscope sensor, an accelerometer, a proximity sensor, an ambient light sensor, and a localization unit. The localization unit may also be part of or interact with the network interface 920 to communicate with components of the localization network (e.g., Global Positioning System (GPS) satellites).

The data processing methods provided by some embodiments may be performed by the processor 904 in the server 100 described above.

What is claimed is:

1. A method applied to a database system, comprising:

receiving, by a query parser of the database system, a structured query language (SQL) data processing request that indicates processing on data in a database, the processing including first data processing and second data processing, the first data processing being different from the second data processing;

generating, by a query optimizer of the database system, a physical plan in response to the SQL data processing request, the physical plan comprising a first physical operator, or comprising the first physical operator and a second physical operator;

determining a first data format based on a first reading order in which a plurality of first data to be processed by a first phase of the first physical operator is read during the first data processing, wherein the first data format is selected from a row-based format, a column-based format, or a hybrid format;

converting the plurality of first data into the first data format;

executing the first data processing on the converted plurality of first data via the first phase of the first physical operator to generate a result of the first data processing;

determining a second data format based on a second reading order in which a plurality of second data to be processed by a second phase of the first physical operator or the second physical operator is read during the second data processing, wherein the second data format is selected from the row-based format, the column-based format, or the hybrid format, and the second data format is different from the first data format, the plurality of second data includes the result of the first data processing;

converting the plurality of second data into the second data format; and executing the second data processing on the converted plurality of second data via the second phase of the first physical operator or via the second physical operator, wherein the first data processing has a higher execution efficiency for the first data format than for the second data format, and the second data processing has a higher execution efficiency for the second data format than for the first data format, and wherein the converting the plurality of first data and the converting the plurality of second data occur in real-time during query execution without pre-storing data in multiple formats.

2. The method according to claim 1, wherein:

when the first data processing includes one of aggregation, filtering, or inter-column operation, the first data format comprises the column-based format;

when the first data processing includes one of merging, itemizing, or inter-row operation, the first data format comprises the row-based format; and when the first data processing includes at least one of: the aggregation, the filtering, or the inter-column operation, and at least one of the merging, the itemizing, or the inter-row operation, the first data format comprises the hybrid format.

3. The method according to claim 1, wherein the determining the first data format based on the first reading order in which the plurality of first data is read during the first data processing includes:

when the first reading order includes row-by-row reading, determining that the first data format is the row-based format; and when the first reading order includes column-by-column reading, determining that the first data format is the column-based format.

4. The method according to claim 1, wherein the determining the first data format based on the first reading order in which the plurality of first data is read during the first data processing includes:

when the first reading order including sequentially reading first data of a first target row, second data of a second target row, and the first target row and the second target row are not adjacent to each other, determining that the first data format is to store the first target row and the second target row adjacent to each other; and when the first reading order including sequentially reading first data of a first target column, second data of a second target column, and the first target column is not adjacent to the second target column, determining that the first data format is to store the first target column and the second target column adjacent to each other.

5. The method according to claim 1, wherein:

the plurality of first data includes at least one of data in the database or data obtained by processing based on the data in the database; and the plurality of second data includes at least one of the data in the database or the data obtained by processing based on the data in the database.

6. The method according to claim 1, wherein the converting the plurality of first data and the converting the plurality of second data are performed by a VectorTransformer that rewrites data based on a VectorOrder.

7. The method according to claim 1, wherein determining the first data format and the second data format is based on a layout and cache aware cost model that estimates cache misses for different data formats.

8. The method according to claim 1, wherein the first physical operator comprises one of a scan operator, a filter operator, an aggregation operator, a join operator, or a project operator.

9. The method according to claim 1, wherein the plurality of first data and the plurality of second data are stored in a VectorBatch data structure that supports transformation between the row-based format, the column-based format, and the hybrid format during the query execution.

10. The method according to claim 1, wherein the plurality of first data and the plurality of second data are stored in a single storage engine, and the converting the plurality of first data and the converting the plurality of second data are performed by a single execution engine.

11. The method according to claim 1, wherein the first physical operator comprises an aggregation operator, the first phase comprises a groupby operation, and the second phase comprises an aggregation operation on grouped data.

12. An apparatus applied to a database system, comprising:

one or more processors; and memory storing computer-executable instructions that, when executed by the one or more processors, cause the apparatus to:

receive, by a query parser of the database system, a structured query language (SQL) data processing request that indicates processing on data in a database, the processing including first data processing and second data processing, the first data processing being different from the second data processing;

generate, by a query optimizer of the database system, a physical plan in response to the SQL data processing request, the physical plan comprising a first physical operator, or comprising the first physical operator and a second physical operator;

determine a first data format based on a first reading order in which a plurality of first data to be processed by a first phase of the first physical operator is read during the first data processing, wherein the first data format is selected from a row-based format, a column-based format, or a hybrid format;

convert the plurality of first data into the first data format;

execute the first data processing on the converted plurality of first data via the first phase of the first physical operator to generate a result of the first data processing;

determine a second data format based on a second reading order in which a plurality of second data to be processed by a second phase of the first physical operator or the second physical operator is read during the second data processing, wherein the second data format is selected from the row-based format, the column-based format, or the hybrid format, and the second data format is different from the first data format, the plurality of second data includes the result of the first data processing;

convert the plurality of second data into the second data format; and execute the second data processing on the converted plurality of second data via the second phase of the first physical operator or via the second physical operator, wherein the first data processing has a higher execution efficiency for the first data format than for the second data format, and the second data processing has a higher execution efficiency for the second data format than for the first data format, and wherein converting the plurality of first data and converting the plurality of second data occur in real-time during query execution without pre-storing data in multiple formats.

13. A non-transitory computer-readable storage medium storing instructions, which when executed by one or more processors, cause a device to:

receive, by a query parser of a database system, a structured query language (SQL) data processing request that indicates processing on data in a database, the processing including first data processing and second data processing, the first data processing being different from the second data processing;

generate, by a query optimizer of the database system, a physical plan in response to the SQL data processing request, the physical plan comprising a first physical operator, or comprising the first physical operator and a second physical operator;

determine a first data format based on a first reading order in which a plurality of first data to be processed by a first phase of the first physical operator is read during the first data processing, wherein the first data format is selected from a row-based format, a column-based format, or a hybrid format;

convert the plurality of first data into the first data format;

execute the first data processing on the converted plurality of first data via the first phase of the first physical operator to generate a result of the first data processing;

determine a second data format based on a second reading order in which a plurality of second data to be processed by a second phase of the first physical operator or the second physical operator is read during the second data processing, wherein the second data format is selected from the row-based format, the column-based format, or the hybrid format, and the second data format is different from the first data format, the plurality of second data includes the result of the first data processing;

convert the plurality of second data into the second data format; and execute the second data processing on the converted plurality of second data via the second phase of the first physical operator or via the second physical operator, wherein the first data processing has a higher execution efficiency for the first data format than for the second data format, and the second data processing has a higher execution efficiency for the second data format than for the first data format, and wherein converting the plurality of first data and converting the plurality of second data occur in real-time during query execution without pre-storing data in multiple formats.

* * * * *